UNITED STATES PATENT OFFICE.

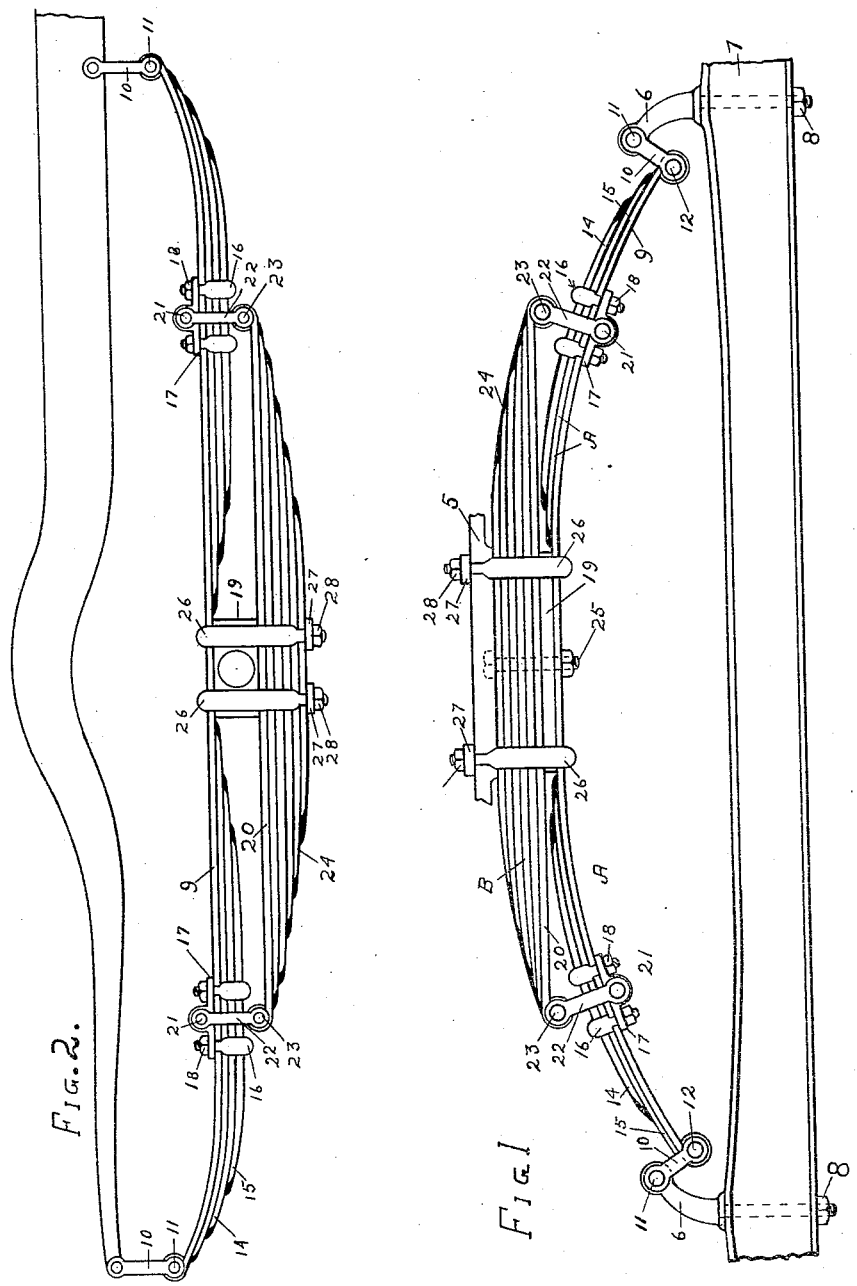

JOHN A. McANULTY, OF INDIANAPOLIS, INDIANA.

SPRING FOR VEHICLES.

1,195,050. Specification of Letters Patent. Patented Aug. 15, 1916.

Application filed August 2, 1915. Serial No. 43,290.

*To all whom it may concern:*

Be it known that I, JOHN A. McANULTY, a citizen of the United States, now residing at Indianapolis, in the county of Marion and State of Indiana, have invented certain new and useful Improvements in Springs for Vehicles, of which the following is a specification.

My invention relates to improvements in vehicle springs, in which a greater latitude of rise and fall of the wheels and axle is obtained than the combined deflection of the springs, to be used in limited spaces, and is designed to be a modification of Letters Patent No. 1,060,778, granted me on the 6th day of May, 1913. This object I attain by combining the fulcrum and lever springs in such a manner as to eliminate any hinge connection of the inner ends of the lever springs with the fulcrum springs.

Figure 1 is an elevation of my invention used as an end spring unit. Fig. 2 is an inverted view showing the spring unit used as side springs.

The numeral 5 in the drawing represents a member forming that part of the base or cross member of a vehicle body to which springs are attached.

6 represents bracket bearing members of a vehicle axle 7. The member 6 may be formed with eyes through their upper extension for hinge connection with springs, and with tangs formed in their lower extensions, which tangs pass downward through holes formed in the axle, and are clamped to the axle by means of the nuts 8.

To the upper ends of the brackets 6 are hinged spring links 10 by means of hinge bolts 11. A master spring leaf 9, having a tie bolt hole formed in its center, forms the lower leaf of lever springs A A. The two ends of the leaf 9 terminate in turned over eyes which are hinged to links 10 by means of hinge bolts 12. Upon the upper side of the outward portions of the master leaf are built up lever springs A A by the addition of a number of shorter leaves, 14 and 15. These shorter leaves are clamped to the master leaf by means of spring clips 16 which encircle the top and sides of the several leaves and pass downward through holes formed in clip bars 17 and receive nuts 18 which when the nuts are drawn clamp the master and built up leaves together. Upon the master leaf over its central part is placed a riser 19. This riser is preferably made of steel bar having a tie bolt hole through its center, and is of a sufficient length to almost cover the space intervening between the inward ends of the leaves 14.

Upon the riser 19 is placed a fulcrum spring B its lower leaf 20 having a tie bolt hole formed in its center. The outward ends of the leaf 20 terminate in eyes or bolt holes to which the upper ends of links 22 are hinged by means of hinge bolts 23. The lower ends of the links 22 are hinged to clip bars 17 by means of hinge bolts 21 which pass through the lower ends of the links and through transverse holes formed in the lower part of the clip bars 17. Upon the leaf 20 is fitted a succession of shorter leaves 24 having holes through their central part sufficient in number and strength to carry the load. A tie bolt 25 clamps the leaves 24 and 20, the filler 19 and the master leaf 9 binding all into one assembled spring member. This assembled spring member is clamped to the vehicle body member 5 by means of clips 26 which encompass the master leaf, the filler, all leaves of the fulcrum spring 12 and the body member. The upper threaded ends of the clips pass through holes formed in clip bars 27 and are drawn by means of nuts 28.

In operation the weight of a load carried by a vehicle presses downward upon the spring B, the outward ends of which being fulcrum bearings under which the central part of the lever springs A press upward as the wheels of the vehicle pass over raised obstructions in the way. The wheels and axles are given greater latitude in vertical action than the yielding of the springs. The fulcrum and lever springs I do not claim broadly, but What I do claim and desire to secure by Letters Patent is:

1. The combination with a vehicle including an axle, and an upwardly extending bracket on each end thereof, of a spring construction having a master leaf pivotally secured at each end thereof to said brackets, a series of leaves built upon said master leaf on each side of the center thereof, for adding strength thereto, a central fulcrum spring fulcrumed at its ends to said master leaf, and means for securing the body of the vehicle to the central portion of said fulcrum spring and master leaf.

2. The combination with a vehicle including an axle, and an upwardly extending bracket on each end thereof, of a spring construction having a master leaf pivoted at its ends to said brackets, two series of leaves built upon each side of the center of said master leaf, a fulcrum spring above said master leaf, and pivoted at its ends thereto, and means for securing the body of the vehicle to said fulcrum spring and master leaf.

3. The combination with a vehicle including an axle, and an upwardly extending bracket on each end thereof, of a spring construction having a master leaf extending the full length of said axle, links for pivotally connecting said leaf to said brackets, two series of leaves secured to said master leaf on each side of the center thereof, a fulcrum spring, links having one end pivoted to each end of said fulcrum spring and the other end pivoted to said master leaf, and means for securing the body of the vehicle to said fulcrum spring and master leaf.

4. The combination with a vehicle including an axle, and an upwardly extending bracket on each end thereof, of a spring construction having a master leaf hinged at each end to said brackets, a plurality of leaves clamped to said master leaf on each side of the center thereof for adding strength thereto, a central fulcrum spring, hinged means for connecting the ends of the fulcrum spring to the end portions of said master leaf, and clamping means for connecting said fulcrum spring and master leaf centrally with the body member of the vehicle.

5. The combination with a vehicle including an axle, and an upwardly extending bracket on each end thereof, of a spring construction having lever and fulcrum springs, clamping means for connecting the central part of the fulcrum spring with the central part of the lever springs, links connecting the outward ends of the fulcrum spring with the end portions of said lever springs, links for connecting the ends of said lever springs to said brackets, and means for securing the vehicle body member to the central portion of said springs.

JOHN A. McANULTY.

Copies of this patent may be obtained for five cents each, by addressing the "Commissioner of Patents. Washington, D. C."